United States Patent
Kaiser

(10) Patent No.: US 6,626,422 B2
(45) Date of Patent: Sep. 30, 2003

(54) CONTROL VALVE

(75) Inventor: Werner Kaiser, Altenthann (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/339,909

(22) Filed: Jan. 10, 2003

(65) Prior Publication Data

US 2003/0107020 A1 Jun. 12, 2003

Related U.S. Application Data

(63) Continuation of application No. PCT/DE01/02474, filed on Jul. 4, 2001.

(30) Foreign Application Priority Data

Jul. 11, 2000 (DE) .......................................... 100 33 611

(51) Int. Cl.$^7$ ................................................ F16K 1/22
(52) U.S. Cl. ...................... 251/305; 123/337; 137/15.25
(58) Field of Search .............................. 251/305, 306, 251/307, 308; 123/337; 137/15.25

(56) References Cited

U.S. PATENT DOCUMENTS

| | | | | |
|---|---|---|---|---|
| 2,529,572 A | | 11/1950 | Raybould | 251/11 |
| 3,111,300 A | * | 11/1963 | Boone, Sr. | 251/308 |
| 3,595,523 A | | 7/1971 | Felton | 251/306 |
| 3,724,812 A | | 4/1973 | Richardson | 251/306 |
| 3,901,964 A | | 8/1975 | Rubright | 264/255 |
| 5,666,988 A | * | 9/1997 | Becker | 137/15.18 |
| 5,715,782 A | | 2/1998 | Elder | 123/184.61 |
| 5,979,401 A | | 11/1999 | Hickey | 123/306 |
| 6,354,267 B1 | * | 3/2002 | Kotchi et al. | 251/305 |
| 6,354,567 B1 | * | 3/2002 | Vanderveen et al. | 251/308 |
| 6,394,068 B1 | * | 5/2002 | Palotay | 123/337 |

FOREIGN PATENT DOCUMENTS

| | | | | |
|---|---|---|---|---|
| DE | 2342102 A1 | 8/1973 | | F16K/1/22 |
| DE | 19717347 C1 | 8/1998 | | F16K/1/22 |
| JP | 08014408 A | 1/1996 | | F16K/1/22 |

OTHER PUBLICATIONS

International Search Report PCT/DE 01/02474, Mailed Nov. 6, 2001.
PCT Written Examination Report PCT/DE 01/02474, Mailed Mar. 05, 2002.

* cited by examiner

*Primary Examiner*—Gene Mancene
*Assistant Examiner*—John Bastianelli
(74) *Attorney, Agent, or Firm*—Baker Botts L.L.P.

(57) ABSTRACT

A control valve including a plastic injection-molded wing body and a shaft having embossed projections thereon, said shaft being positively connected to said wing body, wherein the wing body has, in the direction of an axis perpendicular to the axis of rotation of the shaft, a maximum dimension no greater than the diameter of the shaft, said shaft having the plastic of the wing body injected-molded completely around said shaft in the region of the projections. The control valve may, according to one embodiment, be adapted for use as an intake device for an internal combustion engine, and for use, e.g., as a resonant valve or a throttle valve.

11 Claims, 2 Drawing Sheets

CONTROL VALVE

CROSS-REFERENCE TO RELATED APPLICATION

This application is a continuation of co-pending International Application No. PCT/DE01/02474 filed Jul. 4, 2001, which designates the United States, and claims priority to German application number DE10033611.6 filed Jul. 11, 2000.

TECHNICAL FIELD OF THE INVENTION

Control valves are known, in particular, for use in intake devices for internal combustion engines.

BACKGROUND OF THE INVENTION

DE 197 17 347 C1 discloses a control valve with a plastic injection-molded wing body and with a shaft which has embossed projections and which is connected positively to the wing body. The control valve has an elongate design along its axis of rotation and is therefore suitable for use in intake devices with a variable suction-pipe length, the control valve opening or closing a recess between two suction pipes. The control valve is arranged, with respect to its axis of rotation, parallel to the direction of flow in the suction pipes and therefore, in the open state, protrudes only with a small cross section into the flow in the suction pipes. However, when the control valve is arranged with its axis of rotation perpendicular to the direction of flow of the air in the intake pipes, in order, for example as a swirl valve, to throttle or close individual suction pipes relative to a cylinder, the flow resistance of the control valve in the open state leads to flow losses in the suction pipe. The flow resistance of the control valve is determined essentially by the maximum cross section of the control valve in a plane perpendicular to the direction of flow.

SUMMARY OF THE PREFERRED EMBODIMENTS OF THE INVENTION

The object of the invention is to design a control valve in such a way that it has a low flow resistance. The object is achieved by means of the following features : a control valve having a plastic injection-molded wing body and a shaft having embossed projections thereon positively connected to said wing body, wherein said wing body has, in the direction of an axis perpendicular to the axis of rotation of the shaft, a maximum dimension no greater than the diameter of the shaft, said shaft having the plastic of the wing body injection-molded completely around the same in the region of the projections only. Further advantageous refinements of the invention are characterized in the dependent claims.

BRIEF DESCRIPTION OF THE FIGURES

Exemplary embodiments of the invention are explained in more detail below with reference to the diagrammatic drawing in which.

Elements having the same function and construction are characterized throughout the figures by the same reference symbols.

DETAILED DESCRIPTION OF THE PREFERRED EMBODIMENTS OF THE INVENTION

Figure 1:
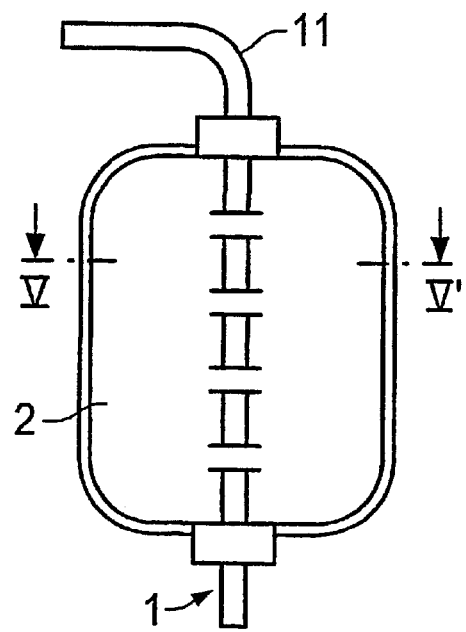
FIG. 1 shows a control valve.
Figure 2:
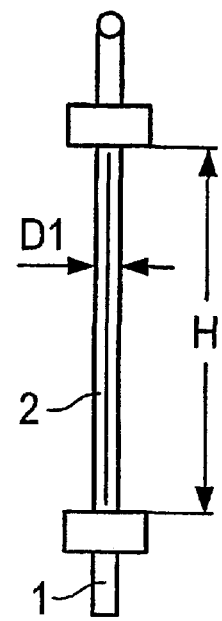
FIG. 2 shows a further view, rotated through 90°, of the control valve according to FIG. 1.
Figure 3:
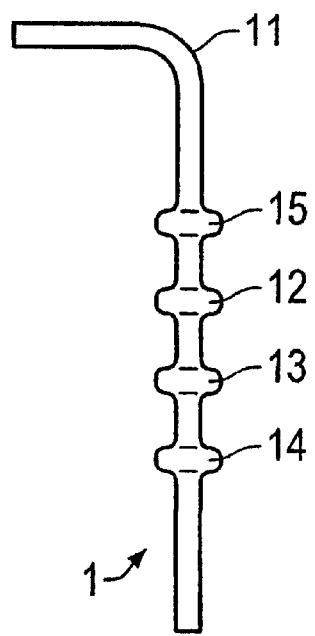
FIG. 3 shows a shaft of the control valve according to FIG. 1.
Figure 4:
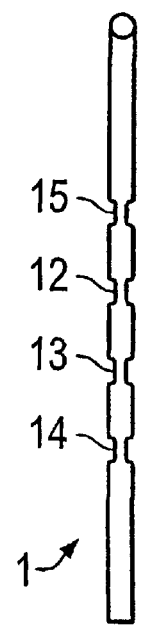
FIG. 4 shows a view, rotated through 90°, of the shaft according to FIG. 3.

The control valve (FIG. 1) has a shaft and a wing body 2. The wing body consists of plastic and has, preferably along the edge, a seal which is, for example, an elastomer. The shaft 1 has an angle in the region 11 which ensures the possibility of simple pivoting between an open position and a closed position, in the installed state, via a linkage, not illustrated, which is driven by an actuator, likewise not illustrated. The actuator is preferably a pressure cell or an electric motor. The control valve has, in a plane perpendicular to a direction of flow 3, a cross section which is defined by the product of the dimension H of the wing body in the direction of the axis of rotation of the shaft 1 and of the dimension D1 of the wing body perpendicular to the axis of rotation of the shaft (FIG. 2). The shaft 1 (FIG. 3) has a plurality of embossed projections 12, 13, 14, 15, at which the cross section of the shaft is reduced by approximately 50% and which are designed in plate form, specifically parallel to the plane of the largest cross section of the wing body 2. The wing body 2 is designed in such a way that, in the direction of an axis perpendicular to the axis of rotation of the shaft 1, it has a dimension which corresponds at most to the diameter of the shaft.

Furthermore, the wing body is designed in such a way that the shaft 1 is injection-molded around completely with the plastic of the wing body in the region of the embossed injections 12 to 15 only. What is achieved thereby is that the wing body cross section essential for the flow resistance is minimal. The dimension D1 of the wing body in the direction of the axis of rotation of the shaft thus corresponds only approximately to the diameter of the shaft. And at the same time, the wing body is connected fixedly in terms of rotation of the shaft 11 by virtue of the positive connection to the shaft in the region of the embossed projections 12 to 15.

Figure 5:
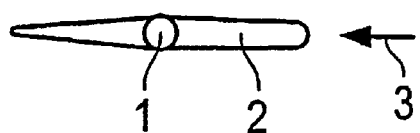
FIG. 5 shows a section through the control valve along the line V V'.

A particularly low flow resistance of the wing body 2 is achieved when the wing body 2 is designed in airfoil form, as illustrated in FIG. 5, the direction of flow being marked by an arrow 3. The dimension D1 of the wing body perpendicular to the axis of rotation of the shaft 1 can thus be reduced to 2 to 3 mm, while the lower limit must be selected such that the necessary stability of the wing body per se is ensured and also favorable available material is available for the shaft made from steel.

Figure 6:
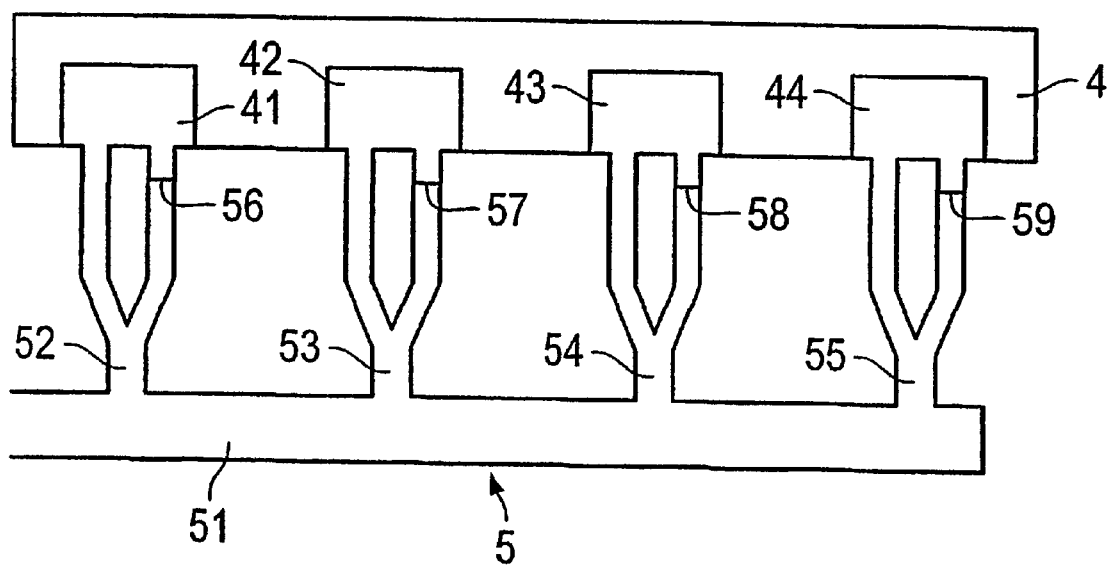
FIG. 6 shows an internal combustion engine.

FIG. 6 discloses an internal combustion engine with an engine block 4 and with an intake device 5. The engine block 4 has cylinders 41, 42, 43, 44 which are connected to the intake device via inlets. The intake device 5 has a manifold 51, from which suction pipes 52, 53, 54, 55 branch off towards the inlets of the cylinders 41 to 44. Control valves 56 to 59, which are designed according to FIGS. 1 to 5, are arranged partly in the suction pipes. The control valves serve, for example, for generating a swirl flow in the respective cylinders 41 to 44 of the internal combustion engine. The control valve may, however, be used as desired, such as, for example, as a resonant valve or as a throttle valve.

What is claimed is:

1. A control valve having a plastic injection-molded wing body and a shaft having embossed projections thereon, said shaft positively connected to the wing body, wherein the wing body has, in the direction of an axis perpendicular to the axis of rotation of the shaft, a maximum dimension no greater than the diameter of the shaft, said shaft having the plastic of the wing body injected-molded completely around same in the region of the embossed projections only.

2. The control valve as claimed in claim 1, wherein the wing body is in air foil form.

3. The control valve of claim 1 wherein said valve is adapted for use as an intake device for an internal combustion engine.

4. The control valve of claim 3 wherein said valve is adapted for generating a swirl flow.

5. The control valve of claim 1 wherein said valve is adapted for use as a throttle valve.

6. The control valve of claim 1 wherein said valve is adapted for use as a resonant valve.

7. The control valve of claim 1 wherein the wing body has an edge, said edge comprising a seal.

8. The control valve of claim 7 wherein the seal comprises an elastomer.

9. The control valve of claim 1 wherein the projections are located at a region of reduced cross section on the shaft.

10. The control valve of claim 9 wherein the cross section is reduced up to approximately 50 percent.

11. The control valve of claim 1 wherein the projections are in plate form and are parallel to the plane of the largest cross section of the wing body.

* * * * *